Aug. 8, 1961
T. NAKAGAWA
2,994,961
DEEP BORE INDICATING TOOL
Filed July 14, 1958
2 Sheets-Sheet 1
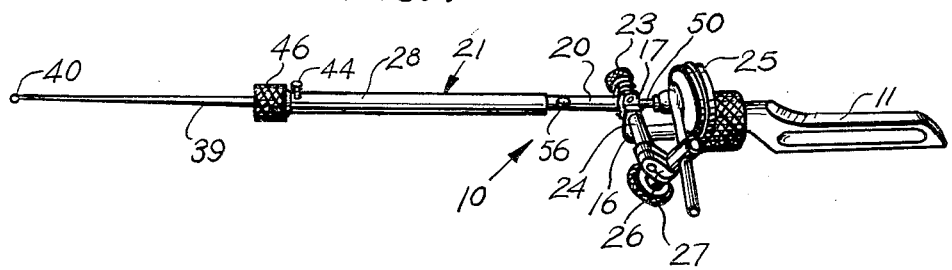
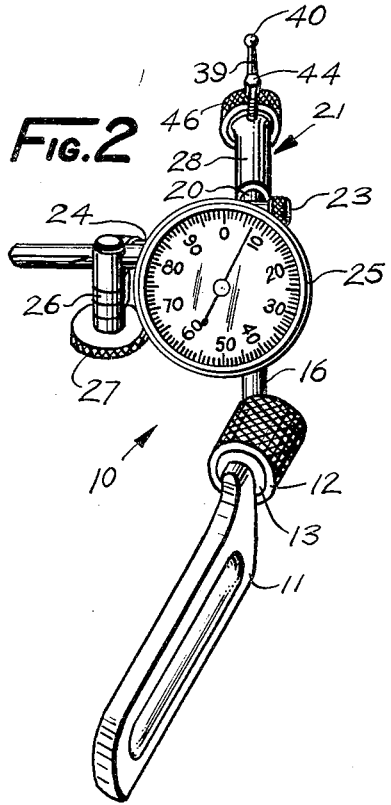
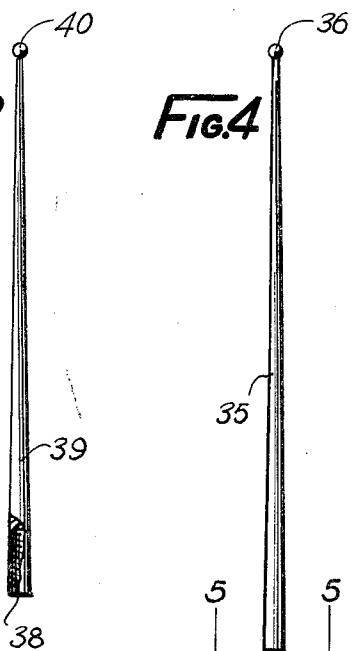
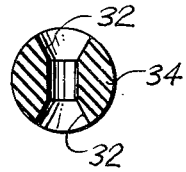
INVENTOR.
TOSHIHIRO NAKAGAWA

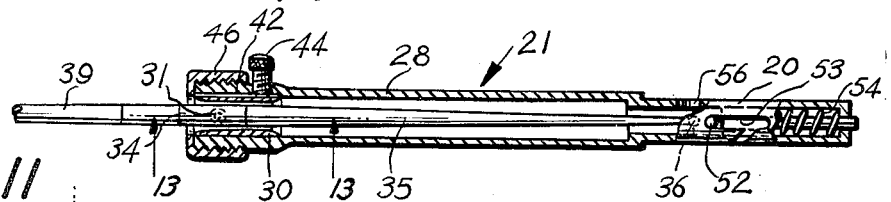
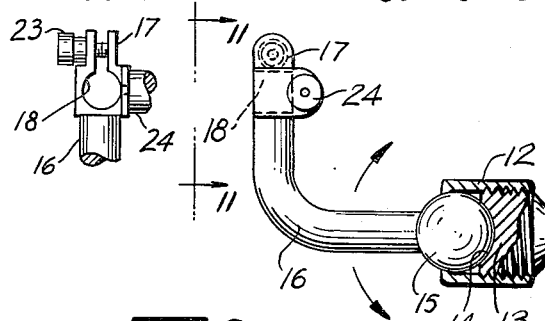
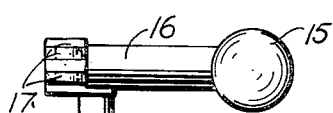
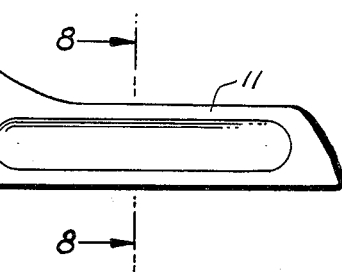
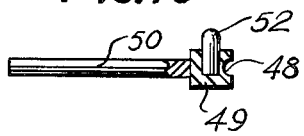
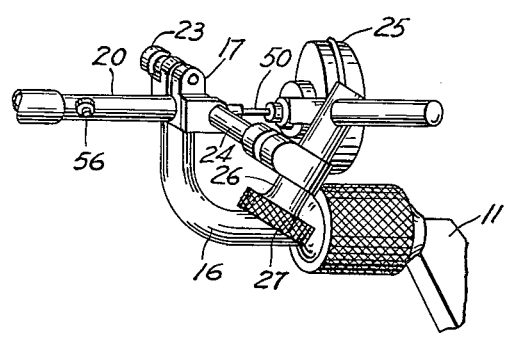
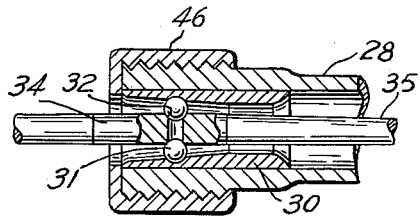

United States Patent Office 2,994,961
Patented Aug. 8, 1961

2,994,961
DEEP BORE INDICATING TOOL
Toshihiro Nakagawa, 256 Valley Ave., Wahiawa, Hawaii
Filed July 14, 1958, Ser. No. 748,247
1 Claim. (Cl. 33—172)

This invention relates to tools and more particularly to a measuring device.

It is an object of the present invention to provide a deep bore indicating tool that can be selectively used to check internal bores of cylinders and narrow crevices.

Another object of the present invention is to provide a deep bore indicating tool that can be used for checking both the depth of the crevice or bore and the width thereof.

Still another object of the present invention is to provide a deep bore indicating tool of the above type that can be readily mounted upon a machine tool for providing readings in a safe and convenient manner without interfering with the normal operation of the machine.

Other objects of the invention are to provide a deep bore indicating tool bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a perspective view of a deep bore indicating tool made in accordance with the present invention arranged to check the machined face of a work piece or the depth of a bore or crevice;

FIGURE 2 is an enlarged rear elevational view of a tool shown in FIGURE 1 in an offset position;

FIGURE 3 is a side elevational view, with parts broken away, of a sensing rod portion forming a part of the present invention;

FIGURE 4 is a view similar to FIGURE 3, showing an indicating rod portion forming another part of the present invention;

FIGURE 5 is an enlarged transverse cross sectional view taken along line 5—5 of FIGURE 4;

FIGURE 6 is an enlarged fragmentary longitudinal cross sectional view of the main measuring unit forming another part of the present invention;

FIGURE 7 is an enlarged side elevational view, with parts boken away, showing a base and mounting assembly forming another part of the present invention;

FIGURE 8 is a transverse cross sectional view taken along line 8—8 of FIGURE 7;

FIGURE 9 is a top plan view of certain parts of the apparatus shown in FIGURE 7;

FIGURE 10 is a bottom plan view, with parts broken away, of a slide member forming another part of the present invention;

FIG. 11 is a sectional detail view taken on line 11—11 of FIG. 7;

FIG. 12 is an enlarged elevational view of the dial indicator clamping arrangement shown in FIG. 1; and FIG. 13 is an enlarged longitudinal cross sectional detail view taken on line 13—13 of FIG. 6.

Referring now more in detail to the drawing, a deep bore indicating tool 10 made in accordance with the present invention is shown to include a base 11 having a universal coupling unit 12 for supporting an L-shaped mounting bar 16 in an adjusted position. This coupling 12 includes an outwardly concave bearing plate 13 having a socket 14 slidably receiving a ball 15 that is integral with the bar 16. The opposite end of the bar 16 is provided with spaced apart flanges 17 that define a longitudinal opening 18 for clamping engagement with the terminal housing portion 20 at one end of the main measuring unit 21 hereinafter more fully described. A thumb screw 23 adjustably clamps the terminal housing 20 within the clamp flanges 17, while an outwardly extending mounting post 24 for supporting a gauge 25 is also provided with a clamp 26 adjustably securing the gauge 25 in different measuring positions.

The main measuring unit 21 includes a main cylindrical housing member 28 having a collar 30 slidably supported within the outermost end thereof. This collar 30 has a pair of diametrically opposed inwardly extending bearings 31 that are received within similar diametrically opposite and inwardly tapered openings 32 in the cylindrical portion 34 of an outwardly tapered indicating rod 35 that has a ball member 36 at its outermost end. This indicating rod portion 34 has an externally threaded shaft 37 at its base end that is threadedly received within an internally threaded bore 38 in the base end of a sensing rod portion 39 that is also outwardly tapered and provided with a ball member 40 at its outermost end. The indicating rod portion and sensing rod portion are rigidly connected together to form a single elongated rod member that is supported by the main housing 28 with the indicating rod portion 35 thereof completely enclosed therewithin.

As is more clearly shown in FIGURE 6 of the drawing, the collar 30 is provided with a longitudinal groove 42 which receives a pin integral with the inner end of a thumb screw 44 that is threadedly carried by the outer end of the cylindrical member 28, which thumb screw can thus be used to selectively clamp the collar and pivotally connect the elongated member in any desired adjusted longitudinal position. When the collar 30 is in the outermost position, illustrated in FIGURE 6 of the drawing, the ball element 36 of the indicating rod portion 35 is out of engagement with the socket 48 formed in the head 49 of a plunger 50 slidably supported within the terminal housing portion 20 of the unit. This plunger 50 extends outwardly through the terminal housing portion 20 into abutting engagement with the gauge 25, while the head portion 49 is provided with a guide pin 52 that extends laterally outwardly through a longitudinal slot 53 in the side of the terminal housing portion 20. A compression spring 54 acting between the inside of the terminal housing portion 20 and the plunger head 49 normally urges the plunger toward a retracted position within the housing, thus resisting longitudinal movement of the elongated rod member into the interior of the main cylindrical member 28. However, when the collar 30 is in the aforementioned extreme outermost position, the ball member 36 is out of engagement with the socket 48, whereby the elongated rod member is free to pivot about the pivot bearings 31. The extent of this pivotal movement can be detected by projecting the sensing plunger of the gauge 25 into a laterally extending opening 56 in the side of the terminal housing 20 that is adjacent to the retracted ball end 36 of the indicating rod portion 35. In this position, the tool may be used to measure the width or diameter of a crevice bore of a work piece.

In order to use the tool for measuring the depth of a bore or the machined face of a work piece, it is only necessary to loosen the set screw 44, to enable the ball member 36 of the indicating rod portion 35 to move into the socket 48 of the plunger head 49. This locks the elongated rod against pivotal movement about the pivot bearings 31, whereupon longitudinal movement of the elongated rod portion will be transmitted to the plunger 50 and to the sensing elemental plunger of the gauge 25. The mounting post 24 and associated clamp 26 enable the gauge 25 to be selectively rotated between the two operating positions, the position illustrated in FIGURES 1 and 2 illustrating the tool in use for detecting the depth of a bore with the plunger 50 in abutment with the sensing element of the gauge 25. Upon rotating the gauge 25 about the mounting post 24 to the adjusted position, the sensing element of the gauge will automatically become aligned with the access opening 56 to enable the gauge to be used for detecting the pivotal movement of the elongated rod member when the tool is used for detecting the width or diameter of a bore. It will be noted in FIGURE 6 of the drawing, that the inside bore of the collar 30 is flared outwardly in both directions to accommodate the pivotal movement of the elongated rod member therewithin.

While various changes may be made in the detail construction, it shall be understood that such changes shall be within the spirit and scope of the present invention as defined by the appended claim.

What I claim as new and desire to protect by Letters Patent of the United States is:

A deep bore indicating tool comprising, in combination, a base, a hollow cylindrical member, coupling means adjustably securing one end of said cylindrical member to said base, an elongated member, bearing means pivotally and slidably supporting said elongated member partially within said cylindrical member, slide means selectively detecting the extent of said sliding movement of said elongated member, said cylindrical member having means giving access thereto for selectively detecting the extent of said pivotal movement of said elongated member, said coupling member comprising an L-shaped bar having a clamp at one end for securing engagement with said cylindrical member, a universal coupling at the opposite end of said L-shaped bar pivotally connected to said base, said elongated member comprising an indicating rod portion and a sensing rod portion each having one base end secured to each other and each tapering outwardly toward the opposite ends thereof, said outwardly tapered end of said indicating rod portion extending into said cylindrical member, said outwardly tapered end of said sensing rod portion extending outwardly of said cylindrical member, said bearing means comprising a collar slidably supported within said cylindrical member adjacent to the end opposite said base, a pair of diametrically oppositely inwardly extending bearing pins carried by said collar pivotally engaging a mid portion of said elongated member, said slide means comprising a plunger slidably guided by said one end of said cylindrical member in abutment with said outwardly tapered end of said indicating rod portion, a gauge connected to said plunger for recording the extent of sliding movement of said elongated member, said access means comprising a transversely extending bore in said one end of said cylindrical member communicating with the interior thereof adjacent to said outwardly tapered end of said indicating rod portion, said gauge having means for engagement with said indicating rod portion for detecting said pivotal movement of said elongated member, and a set screw supported upon said cylindrical member for selective abutting engagement with said collar releasably securing said collar against sliding movement in spaced relationship with said plunger.

References Cited in the file of this patent

UNITED STATES PATENTS

| | | |
|---|---|---|
| 1,380,580 | Nell | June 7, 1921 |
| 1,413,232 | Miolla | Apr. 18, 1922 |
| 2,073,089 | Autenrieth | Mar. 9, 1937 |
| 2,322,033 | Le Brun | June 15, 1943 |